United States Patent
Ugur et al.

(10) Patent No.: US 8,254,450 B2
(45) Date of Patent: Aug. 28, 2012

(54) SYSTEM AND METHOD FOR PROVIDING IMPROVED INTRA-PREDICTION IN VIDEO CODING

(75) Inventors: Kemal Ugur, Tampere (FI); Jani Lainema, Tampere (FI); Antti Hallapuro, Tampere (FI)

(73) Assignee: Nokia Corporation, Espoo (FI)

( * ) Notice: Subject to any disclaimer, the term of this patent is extended or adjusted under 35 U.S.C. 154(b) by 953 days.

(21) Appl. No.: 12/194,498

(22) Filed: Aug. 19, 2008

(65) Prior Publication Data

US 2009/0052535 A1 Feb. 26, 2009

Related U.S. Application Data

(60) Provisional application No. 60/957,662, filed on Aug. 23, 2007.

(51) Int. Cl.
 *H04B 1/66* (2006.01)
(52) U.S. Cl. .............................. 375/240.13; 375/240.12
(58) Field of Classification Search .................. None
See application file for complete search history.

(56) References Cited

U.S. PATENT DOCUMENTS

| | | | |
|---|---|---|---|
| 2007/0083578 A1* | 4/2007 | Chen et al. | 708/203 |
| 2008/0025397 A1* | 1/2008 | Zhao et al. | 375/240.13 |
| 2008/0031347 A1* | 2/2008 | Segall | 375/240.19 |
| 2008/0219354 A1* | 9/2008 | Segall et al. | 375/240.23 |
| 2009/0010337 A1* | 1/2009 | Wang | 375/240.16 |
| 2012/0087410 A1* | 4/2012 | Gordon et al. | 375/240.12 |

\* cited by examiner

*Primary Examiner* — Phirin Sam
(74) *Attorney, Agent, or Firm* — Alston & Bird LLP (57) ABSTRACT

A system and method for improving the efficiency of decoding intra-coded blocks in video decoding, even in the event that neighboring pixels of the block are unavailable. According to various embodiments, in addition to information that is used to describe how a prediction is formed using a specified process, other "side" information is also transmitted for use in the decoding process. For example, after the intra-prediction direction of a block is decoded, it is determined whether the intra-prediction requires pixels that are unavailable for the block. If such pixels are needed, than side information may be parsed from the bitstream in a predetermined manner. The prediction signal may then be reconstructed for the block using various pieces of information.

22 Claims, 7 Drawing Sheets

SYSTEM AND METHOD FOR PROVIDING IMPROVED INTRA-PREDICTION IN VIDEO CODING

CROSS-REFERENCE TO RELATED APPLICATIONS

The present application claims priority to U.S. Provisional Application No. 60/957,662, filed Aug. 23, 2007 and incorporated herein by reference.

FIELD OF THE INVENTION

The present invention relates generally to video coding. More particularly, the present invention relates to the encoding and decoding of intra-coded blocks in video coding.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video codec typically comprises an encoder that transforms input video into a compressed representation suited for storage/transmission and a decoder that can uncompress the compressed video representation back into a viewable form. Typically, the encoder discards some information in the original video sequence in order to represent the video in a more compact form, i.e., at a lower bitrate.

Typical hybrid video codecs, for example ITU-T H.263 and H.264 codecs, encode the video information in two phases. In the first phase, pixel values in a certain picture area (or "block") are predicted. For example, motion compensation mechanisms may be used to find and indicate an area in one of the previously coded video frames that corresponds closely to the block being coded. As another example, spatial mechanisms may use the pixel values around the block to be coded in a specified manner. If a block is predicted by motion compensation mechanisms, it is referred to as an inter-coded block or an inter-block. If a block is predicted by spatial compensation mechanisms, it is referred to as an intra-coded block or an intra-block. Second the prediction error, i.e. the difference between the predicted block of pixels and the original block of pixels, is coded. This is typically accomplished by transforming the difference in pixel values using a specified transform such as a Discreet Cosine Transform (DCT) or a variant thereof, quantizing the coefficients and entropy coding the quantized coefficients. By varying the fidelity of the quantization process, the encoder can control the balance between the accuracy of the pixel representation (i.e., the picture quality) and the size of the resulting coded video representation (i.e., the file size or transmission bitrate).

The decoder reconstructs the output video by applying prediction mechanisms that are similar to those used by the encoder to form a predicted representation of the pixel blocks (using the motion or spatial information created by the encoder and stored in the compressed representation) and prediction error decoding (the inverse operation of the prediction error coding, recovering the quantized prediction error signal in the spatial pixel domain). After applying prediction and prediction error decoding mechanisms, the decoder sums up the prediction and prediction error signals (pixel values) to form the output video frame. The decoder (and encoder) can also apply additional filtering mechanisms to improve the quality of the output video before passing it for display and/or storing it as prediction reference for the forthcoming frames in the video sequence.

Figure 1A:
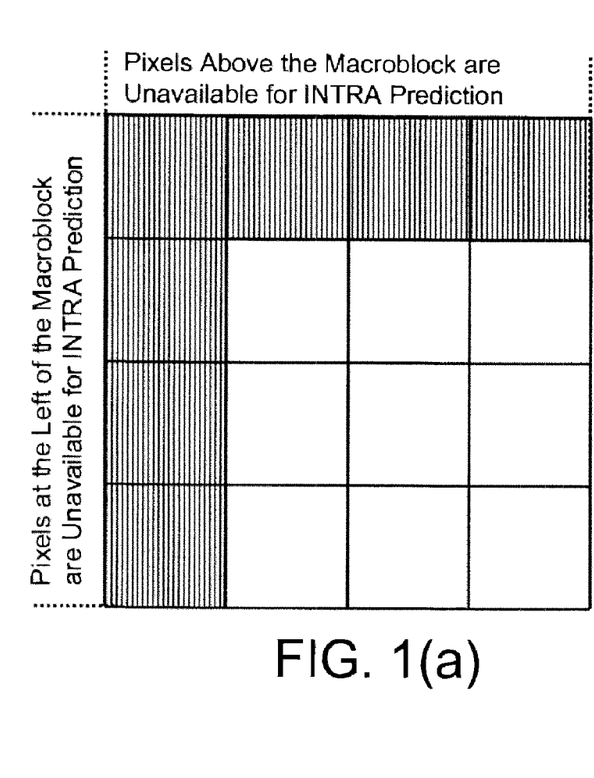
FIG. 1(a) shows the effect of unavailable pixels on intra-prediction based upon 4×4 blocks.
Figure 1B:
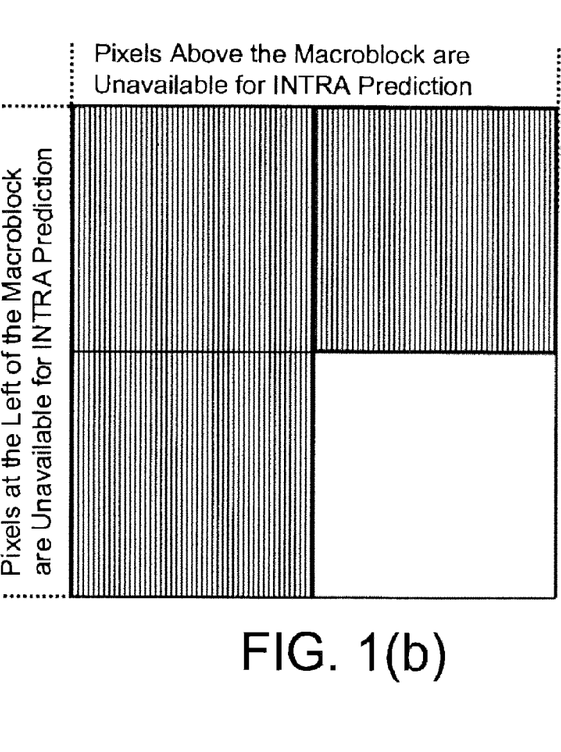
FIG. 1(b) shows the effect of unavailable pixels on intra-prediction based upon 8×8 blocks.
Figure 2:
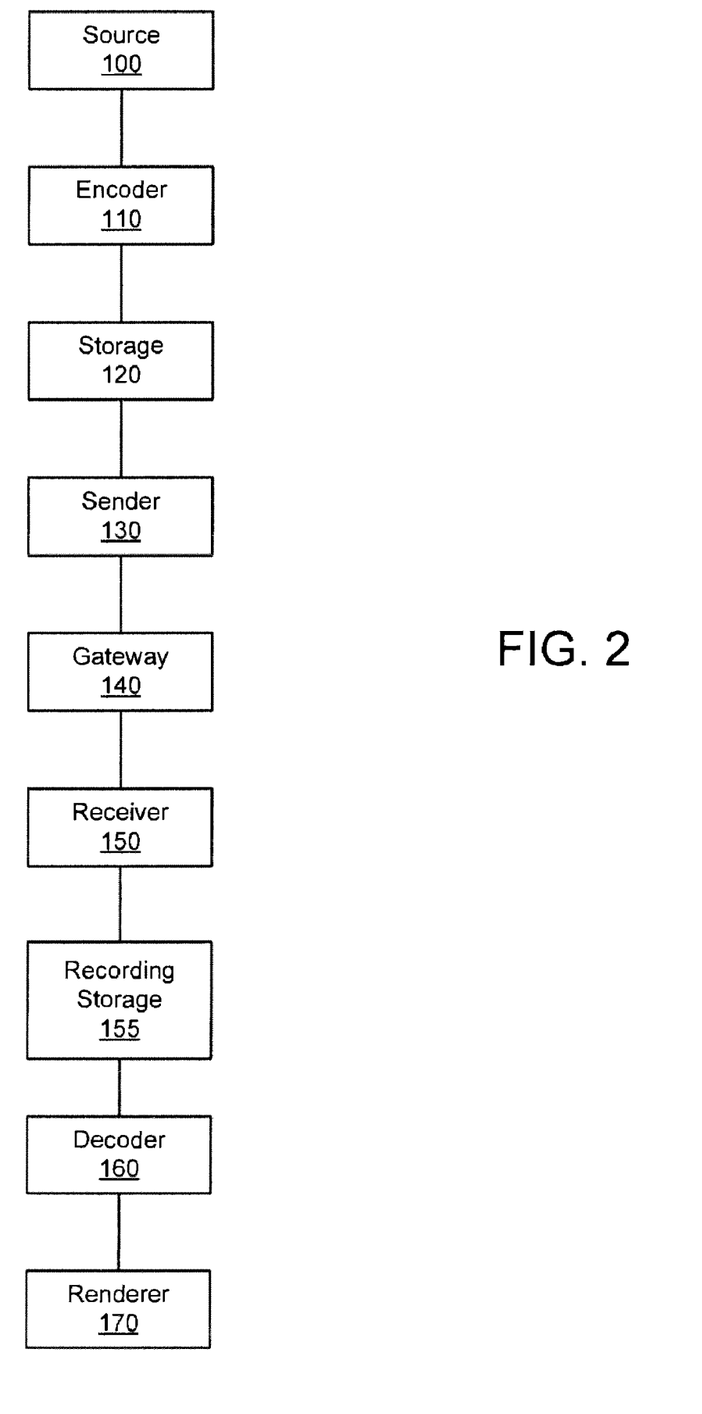
FIG. 2 is an overview diagram of a system within which various embodiments of the present invention may be implemented.

The coding performance of intra-coded blocks depends heavily on the availability of the pixels around the block for prediction. However, the neighboring pixels may be unavailable for prediction for various reasons. For example, such neighboring pixels could be unavailable if (1) the coded block is on a horizontal or vertical boundary of the picture; (2) neighboring blocks are inter-coded, and intra-prediction from inter-coded blocks is restricted in order to reduce spatial propagation of a potential error in transmission; (3) horizontal prediction is restricted for easy pipelining operation, and pixels that are horizontally adjacent to the coded block are unavailable; and (4) neighboring blocks belong to different slices, and intra-prediction between slices is restricted so that each slice is an independently decodable entity. If the neighboring pixels are not available for prediction, then the coding performance for the block is degraded significantly. This problem becomes even more severe if a larger size transform (and larger sized blocks) is used for coding the blocks within the macroblock, as a larger area of the macroblock would be coded without a good prediction compared to the smaller transform case. The problem is depicted in FIGS. 1(a) and 1(b). FIG. 1(a) shows the effect of unavailable pixels on intra-prediction based upon 4×4 blocks. In contrast, FIG. 1(b) shows the effect of unavailable pixels on intra-prediction based upon 8×8 blocks. In both examples, the shaded blocks indicate the blocks that are affected due to the unavailable pixels. As can be observed when comparing these pixels, the larger size transform in FIG. 1(b) is affected to a significantly greater degree than the smaller size transform in FIG. 1(a).

SUMMARY OF THE INVENTION

Various embodiments provide a system and method for improving the efficiency of intra-coded blocks, even in the event that neighboring pixels of the block are unavailable. According to various embodiments, in addition to the information that is used to describe how a prediction is formed using a specified process, other "side" information is also transmitted for use in the decoding process. For example, after the intra-prediction direction of a block is decoded, it is determined whether the intra-prediction requires pixels that are unavailable for the block. If such pixels are needed, than side information may be parsed from the bitstream in a predetermined manner. The prediction signal may then be reconstructed for the block using various pieces of information. After the prediction for the block is generated, the residual data is generated and the block may be reconstructed. Such a system thereby improves the compression efficiency of video and image codecs, even if the neighboring pixels are not available for intra-prediction.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 3:
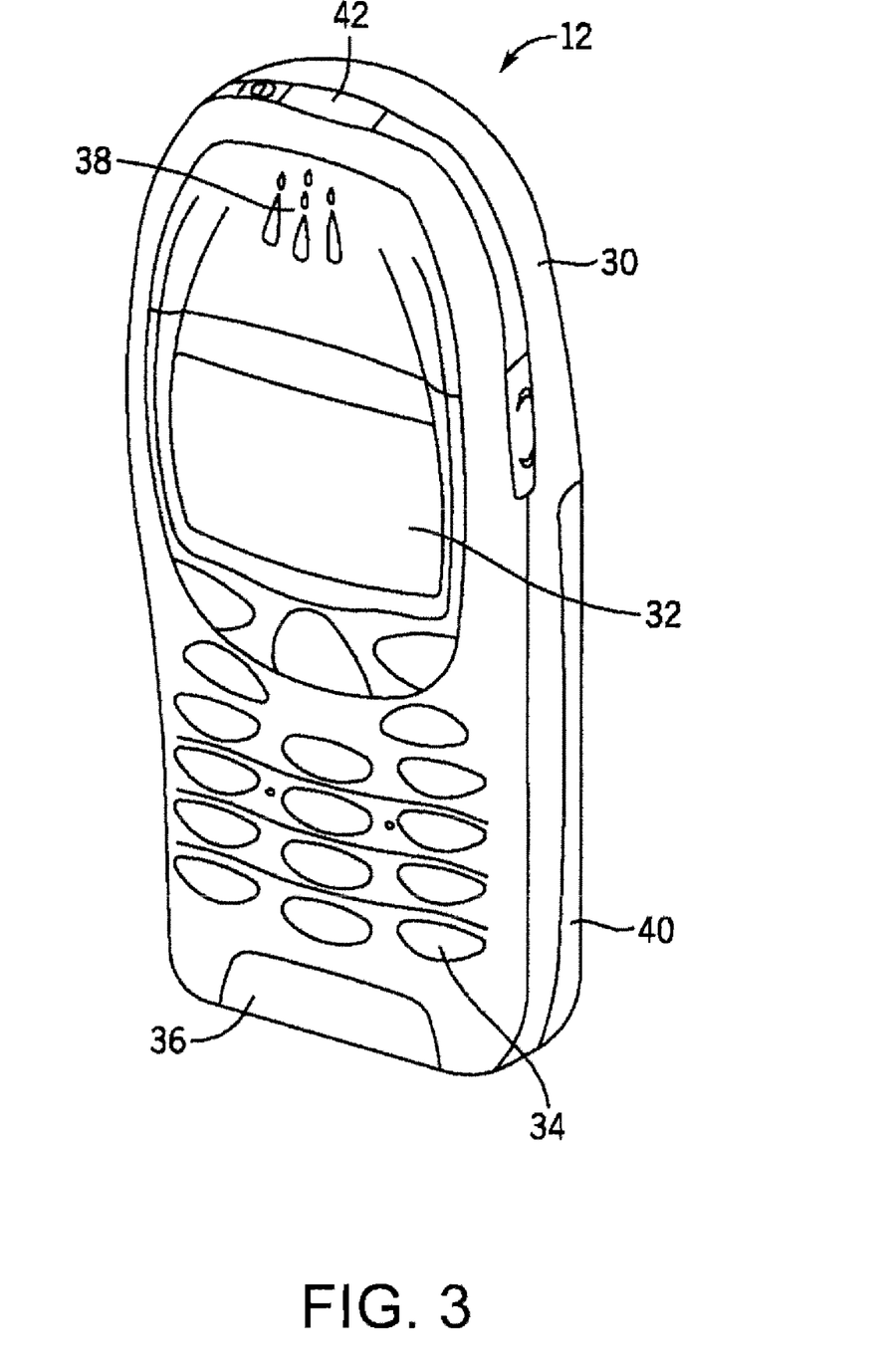
FIG. 3 is a perspective view of an electronic device that can be used in conjunction with the implementation of various embodiments of the present invention.

FIG. 3 is a graphical representation of a generic multimedia communication system within which various embodiments of the present invention may be implemented. As shown in FIG. 3, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 3 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include, but is not limited to, Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data streams according to the downlink and/or receiver capabilities, such as controlling the bit rate of the forwarded stream according to prevailing downlink network conditions. Examples of gateways 140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are many coded media bitstreams, such as an audio stream and a video stream, associated with each other, a container file is typically used and the receiver 150 comprises or is attached to a container file generator producing a container file from input streams. Some systems operate "live," i.e., omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The codec media bitstream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

Communication devices according to various embodiments of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 4:
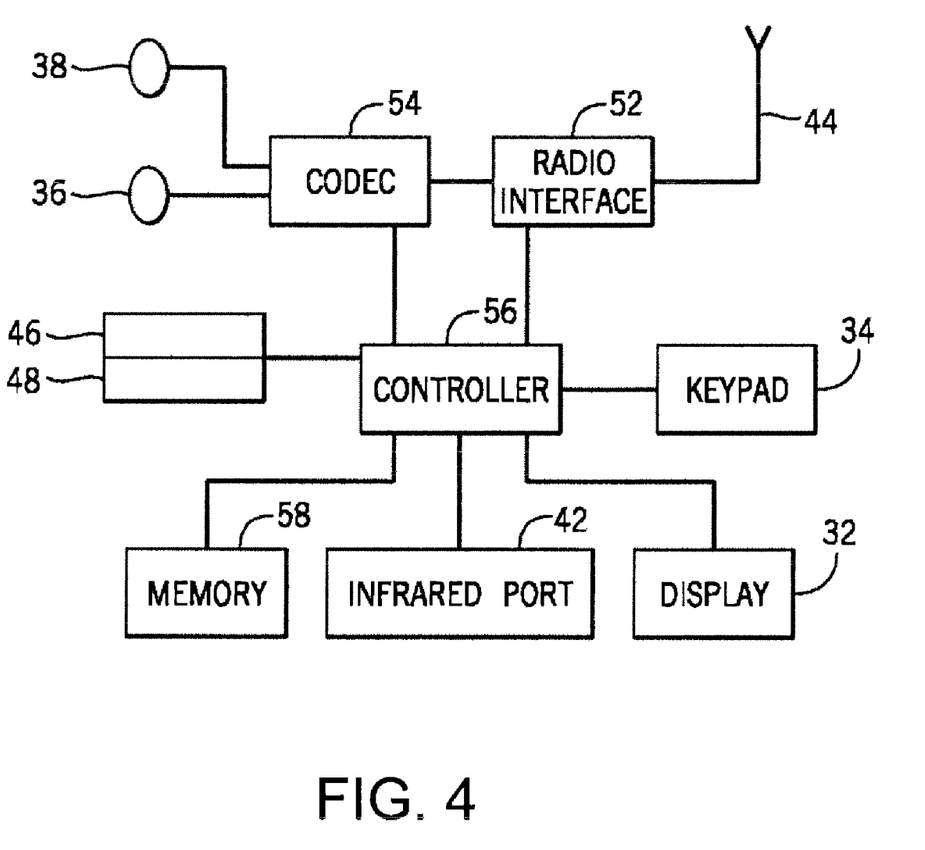
FIG. 4 is a schematic representation of the circuitry which may be included in the electronic device of FIG. 3.

FIGS. 3 and 4 show one representative mobile device 12 within which the present invention may be implemented. It should be understood, however, that the present invention is not intended to be limited to one particular type of electronic device. The mobile device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Various embodiments provide a system and method for improving the efficiency of intra-coded blocks, even in the event that neighboring pixels of the block are unavailable. According to various embodiments, in addition to the information that is used to describe how a prediction is formed using a specified process, other "side" information is also transmitted for use in the decoding process. For example, after the intra-prediction direction of a block is decoded, it is determined whether the intra-prediction requires pixels that are unavailable for the block. If such pixels are needed, then side information may be parsed from the bitstream in a pre-determined manner. The side information may comprise, for example, a pre-determined number of quantized pixel values that are differently coded with variable length codes. The prediction signal may then be reconstructed for the block using various pieces of information. After the prediction for the block is generated, the residual data is generated and the block may be reconstructed. This reconstruction may include information such as received side information, information concerning the intra-prediction direction, and/or other available pixel values. Such a system thereby improves the compression efficiency of video and image codecs, even if the neighboring pixels are not available for intra-prediction.

Figure 5:
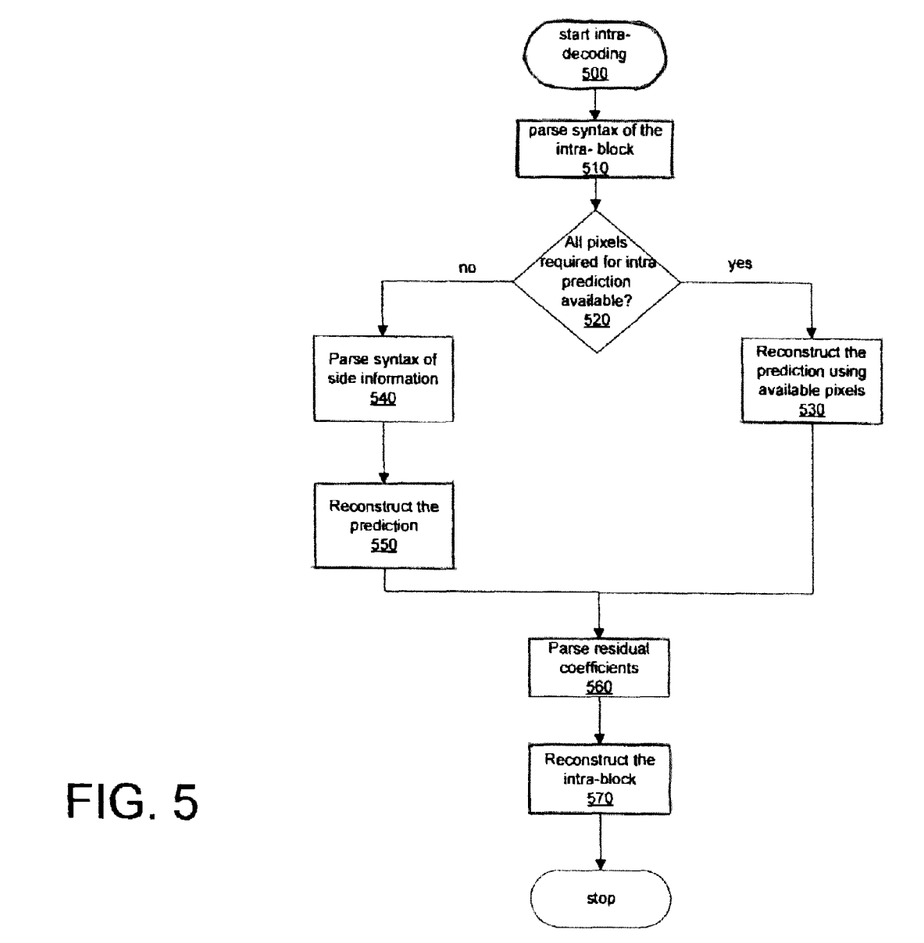
FIG. 5 is a flow chart showing a process by which intra-coded blocks may be decoded according to various embodiments of the present invention.

FIG. 5 is a flow chart showing a decoding process for intra-coded blocks according to various embodiments of the present invention. At 500 in FIG. 5, intra-decoding begins. At 510, the syntax of a particular intra-coded block is parsed. At 520, it is determined whether all of the pixels that are required for intra-prediction are available. If all of the pixels are available, then at 530 the prediction is reconstructed using the available pixels. However, if all of the necessary pixels are not available, then at 540 the syntax of side information is parsed, and this side information is used to reconstruct the prediction at 550. Subsequently, residual coefficients are parsed at 560, and the intra-block is reconstructed at 570.

In implementing various embodiments of the present invention, it is helpful to consider a situation where intra-prediction is performed for blocks of size 8×8, and the uncoded pixels in an 8×8 block are indicated with M(i,j), i,j=0-7, where i and j describe the horizontal and vertical directions, respectively. For simplicity, it is also helpful to consider only two different intra-prediction directions, namely horizontal and vertical prediction. M(−1,j) are the reconstructed pixels prior to deblocking to the left of the block, and M(i,−1) are the reconstructed pixels prior to deblocking above the block.

Without using the various embodiments of the present invention, the prediction P(i,j) for the 8×8 block is defined as:
Vertical prediction:

$$P(i,j)=M(i,-1), i,j=0\text{-}7 \text{ (only valid if all } M(i,-1) \text{ are available)}$$

Horizontal prediction:

$$P(i,j)=M(-1,j), i,j=0\text{-}7 \text{ (only valid if all } M(-1,j) \text{ are available)}$$

In the above description, the horizontal prediction for the block is not allowed if the pixels M(−1,j) are unavailable. Similarly, the vertical prediction is not allowed if the pixels M(i, −1) are unavailable.

In one particular embodiment of the invention, all prediction directions are allowed, even if the neighboring pixels are unavailable for prediction. If the pixels required to form the prediction are not available, then side information is read from the bitstream and the prediction is reconstructed using this side information. The reconstructed pixels from the decoded side information is indicated as H(i), and prediction P(i,j) is defined for one embodiment as follows:
Vertical prediction:

$$P(i,j)=M(i,-1), i,j=0\text{-}7; \text{ if all } M(i,-1) \text{ are available}$$

$$P(i,j)=H(i), i,j=0\text{-}7; \text{ if all } M(i,-1) \text{ are not available}$$

Horizontal prediction:

$$P(i,j)=M(-1,j), i,j=0\text{-}7 \text{ if all } M(-1,j) \text{ are available}$$

$$P(i,j)=H(j), i,j=0\text{-}7; \text{ if all } M(-1,j) \text{ are not available}$$

Figure 6:
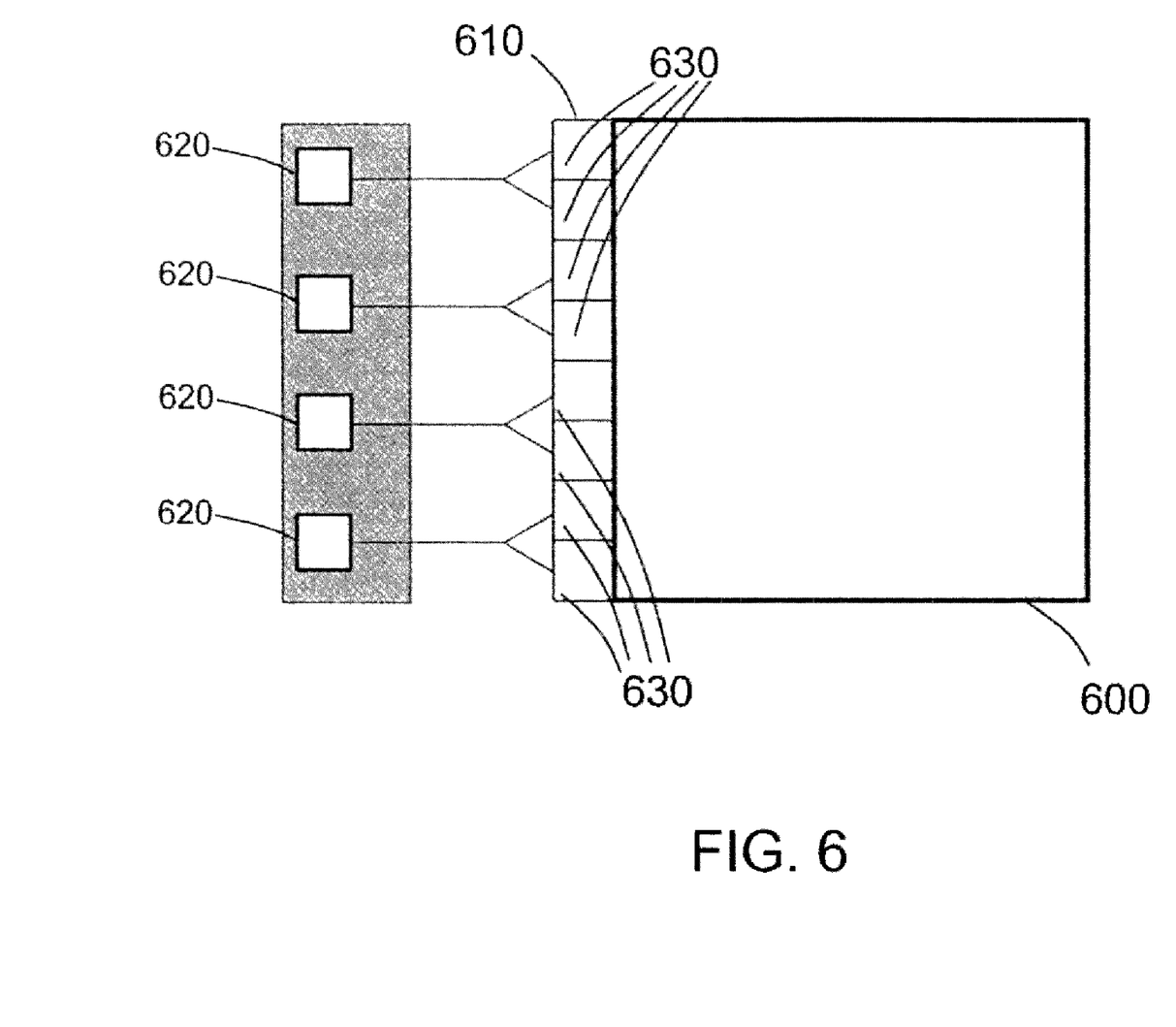
FIG. 6 is an example of reconstructing a horizontal prediction by decoding side information.

In the above example, H(i) is a one dimensional array containing 8 pixel values. There are various ways to signal H(i) in the bitstream. In one method, a quantized pixel value can be signalled for every member of H(i). If intra-prediction is based on 8×8 blocks, then 8 pixel values are signalled. Another option involves, instead of signalling every pixel of H(i), pixels of H(i) can be grouped, and only one pixel value for each group is signalled. The grouping of pixels could occur in many ways. For example, the pixels of H(i) may be grouped into N groups, with each group comprising 8/N pixels and sharing the same value. For example, if N is 4, then the grouping could be accomplished so that H(0)=H(1), H(2)=H(3), etc. This grouping process is depicted in FIG. 6. FIG. 6 shows an 8×8 block 600, for which a prediction 610 is reconstructed. In this example, there are four pixels 620 used to reconstruct the prediction 610, and each of these pixels 620 is used to reconstruct two reconstructed pixels 630. It should also be noted, however, that different grouping structures could also be supported, with different values for N.

Yet another option for signalling H(i) in the bitstream involves signalling only some pixel values, and the pixels of H(i) are obtained by interpolating these signalled values. In this situation, only two pixel values are signalled, and H(i) pixels are obtained by using bilinear interpolation. For example, if two signalled pixel values are indicated as A and B, then pixels of H(i) can be computed as, for example:

$$H(0)=A$$

$$H(1)=(7*A+B+4)>>3$$

$$H(2)=(6*A+2*B+4)>>3$$

$$H(3)=(5*A+3*B+4)>>3$$

$$H(4)=(4*A+4*B+4)>>3$$

$$H(5)=(3*A+5*B+4)>>3$$

$$H(6)=(2*A+6*B+4)>>3$$

$$H(7)=(1*A+7*B+4)>>3$$

In the above, ">>" denotes a shifting of the results by three bits to the right (identical to a division by 8 and rounding towards negative infinity.

Figure 7A:
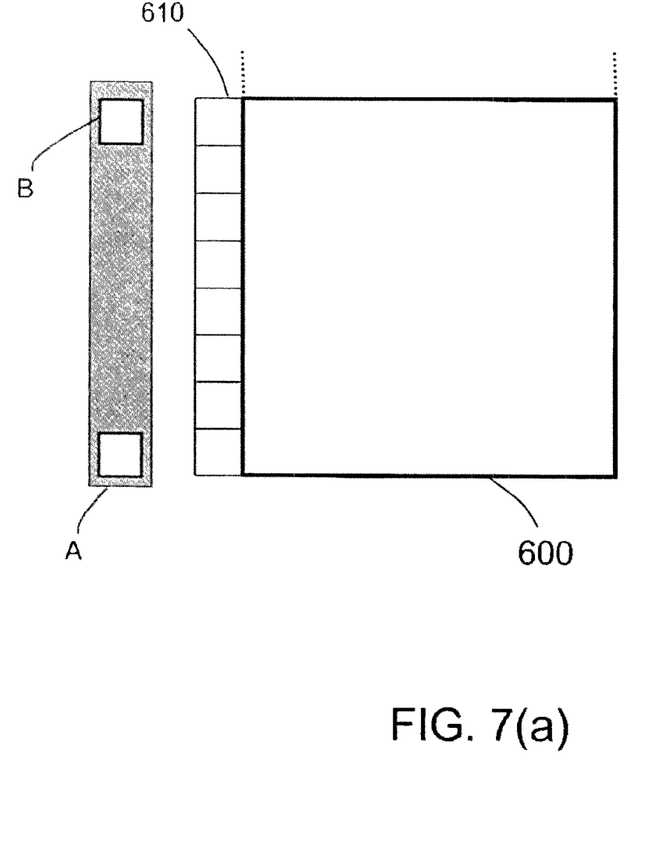
FIG. 7(a) is an example of reconstructing horizontal prediction, with prediction pixels being calculated using two pixel values, where two pixel values are signaled as side information.

The use of two signaled pixel values is depicted, for example, in FIG. 7(a), where a first pixel A and a second pixel B are used. Additionally, it should also be noted that the interpolation process used to obtain H(i) could be different. The signaled pixels could be coded differentially with respect to each, they could be predicted from neighboring available pixels, or the neighboring available pixels could be used as an input to the interpolation process. Still further, even more pixel values could be signaled, and different interpolation techniques could be used. If three pixel values are signaled indicated as A, B and C, pixels of H(i) could be obtained, for example, as:

$$H(0)=(3*A+B+2)>>2$$

$$H(1)=(2*A+2*B+2)>>2$$

$$H(2)=(A+3*B+2)>>2$$

$$H(3)=B$$

$$H(4)=(3*A+B+2)>>2$$

$$H(5)=(2*A+2*B+2)>>2$$

$$H(6)=(A+3*B+2)>>2$$

$$H(7)=C$$

Figure 7B:
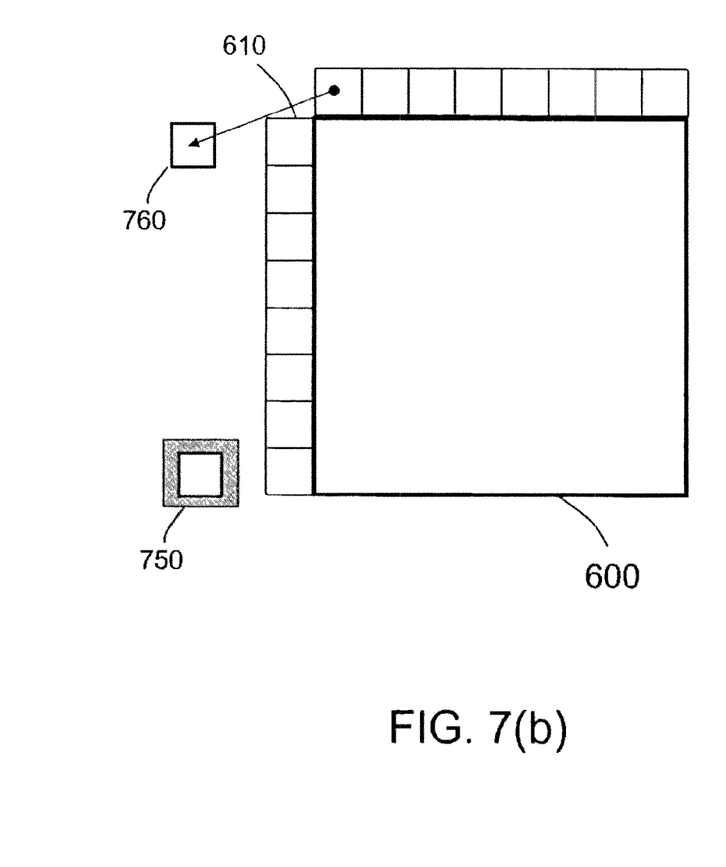
FIG. 7(b) is an example of reconstructing horizontal prediction, with prediction pixels being calculated two pixel values, where one pixel is signaled as side information and another pixel is copied from a neighboring pixel which is available for prediction.

In addition to the above, instead of signaling pixel values, a pre-determined pixel pattern for H(i) could be signaled. Differently still, the quantized pixel values that are used for forming H(i) can be signaled in various ways. As examples, (1) the quantized pixel values can be coded differentially with variable length codes; (2) the quantized pixel values can be coded with arithmetic codes; (3) the quantized pixel values can be derived from transform coefficients representing pixel values in a defined transform domain (e.g., using a Discrete Cosine Transform); (4) the quantized pixel values can be predicted from other available pixels, and only the difference between prediction can be signaled; and (5) neighboring pixels available for prediction could replace some of the quantized pixel values. The use of neighboring pixels is depicted in FIG. 7(b), for example, where a first pixel 750 is signaled as side information and a second pixel 760 is copied from a neighboring pixel which is available for prediction.

In an alternative approach, the H(i) pixel pattern can be signaled even if the pixels required to form the prediction are available. In this case H(i), can be applied as an update to the available pixel predictor, and the vertical and horizontal predictions can be defined, for example as:
Vertical prediction:

$$P(i,j)=M(i,-1)+H(i), i,j=0-7;$$

Horizontal prediction:

$$P(i,j)=M(-1,j)+H(j), i,j=0-7$$

In one particular embodiment of the invention, side information is transmitted if the intra-prediction direction requires unavailable pixels. In other words, there is no explicit signaling, regardless of whether side information is transmitted or not. This signaling can be performed explicitly.

In addition to the above, various embodiments of the present invention can be implemented in still other ways. For example, side information can be used for multiple blocks or macroblocks. Additionally, the various embodiments can be used in a variety of different intra-prediction directions. Still further, the step size used for inverse quantizing the pixels signalled as side information can be indicated in different ways. One way involves using and signalling an offset value, with the offset value indicating the difference between the step size used for inverse quantizing the residual coefficients. Another option involves signalling the step size for every macroblock. This information can be coded differentially with respect to previously transmitted quantization step sizes.

For encoding an intra-block, various embodiments are generally as follows. According to such embodiments, an intra-coded block of data is encoded into a bitstream. Additionally, if not all pixels necessary for intra-prediction of the intra-coded block are available within the encoded intra-coded block syntax of side information is also encoded into the bitstream, with the side information being later used when a prediction for the intra-coded block is to be reconstructed.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. The software, application logic and/or hardware may reside, for example, on a chipset, a mobile device, a desktop, a laptop or a server.

Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method comprising:
    determining whether at least one pixel necessary for intra-prediction of an intra-coded block is not available for use in reconstructing the intra-coded block;
    in an instance in which it is determined that at least one pixel necessary for intra-prediction of the intra-coded block is not available for use in reconstructing the intra-coded block, obtaining side information representative of a set of pixel values or transform coefficients for the intra-coded block from a bitstream;
    deriving a prediction for the intra-coded block based on the side information;
    receiving residual transform coefficients; and
    reconstructing the intra-coded block using the prediction and the residual transform coefficients.

2. The method of claim 1, wherein values for the side information are coded differentially.

3. The method of claim 1, wherein the intra-coded block is reconstructed using information concerning a direction of intra-prediction for the intra-coded block.

4. The method of claim 1, wherein deriving the prediction for the intra-coded block based on the side information comprises interpolating the set of pixel values or transform coefficients.

5. A computer program product, embodied in a non-transitory computer-readable storage medium, comprising computer code configured to, upon execution, cause an apparatus to perform the processes of claim 1.

6. An apparatus, comprising a processor and a memory comprising computer code, the memory and computer code being configured to, with the processor, cause the apparatus to at least:
    determine whether at least one pixel necessary for intra-prediction of an intra-coded block is not available for use in reconstructing the intra-coded block;
    in an instance in which it is determined that at least one pixel necessary for intra-prediction of the intra-coded block is not available for use in reconstructing the intra-coded block, obtain side information representative of a set of pixel values or transform coefficients for the intra-coded block from a bitstream;
    derive a prediction for the intra-coded block based on the side information;
    receive residual transform coefficients; and
    reconstruct the intra-coded block using the prediction and the residual transform coefficients.

7. The apparatus of claim 6, wherein the values for the side information are coded differentially.

8. The apparatus of claim 6, wherein the apparatus is caused to reconstruct the intra-coded block by using information concerning a direction of intra-prediction for the intra-coded block.

9. The apparatus of claim 6, wherein the apparatus is caused to derive the prediction for the intra-coded block from the side information by interpolating the set of pixel values or transform coefficients.

10. A method of comprising:
    determining whether at least one pixel necessary for intra-prediction of an intra-coded block is not available for use in reconstructing the intra-coded block;
    in an instance in which it is determined that at least one pixel necessary for intra-prediction of the intra-coded block is not available for use in reconstructing the intra-coded block, encoding into a bitstream, side information representative of a set of pixel values or transform coefficients for the intra-coded block, the side information being configured for subsequent use in reconstructing a prediction for the intra-coded block; and
    encoding residual transform coefficients into the bitstream.

11. The method of claim 10, wherein encoding values for the side information into the bitstream comprises encoding the side information differentially.

12. The method of claim 10, further comprising encoding into the bitstream information indicative of a direction of intra prediction for the intra-coded block.

13. A computer program product, embodied in a non-transitory computer-readable storage medium, comprising computer code configured to, upon execution, cause an apparatus to perform the processes of claim 10.

14. An apparatus, comprising a processor and a memory including computer code, the memory and computer code being configured to, with the processor, cause the apparatus to at least:
    determine whether at least one pixel necessary for intra-prediction of an intra-coded block is not available for use in reconstructing the intra-coded block;
    in an instance in which it is determined that at least one pixel necessary for intra-prediction of the intra-coded block is not available for use in reconstructing the intra-coded block, encode into a bitstream, side information representative of a set of pixel values or transform coefficients for the intra-coded block, the side information being configured for subsequent use in reconstructing a prediction for the intra-coded block; and
    encode residual transform coefficients into the bitstream.

15. The apparatus of claim 14, wherein the apparatus is caused to encode the side information into the bitstream coded by encoding the side information into the bitstream differentially.

16. The apparatus of claim 14, wherein the apparatus is further caused to encode into the bitstream information indicative of a direction of intra prediction for the intra-coded block.

17. The method of claim 1, wherein the side information is representative of a set of pixel values coded with arithmetic codes.

18. The method of claim 1, wherein the side information is representative of a set of pixel values, the pixel values comprising at least one neighboring pixel that is available for prediction.

19. The apparatus of claim 6, wherein the side information is representative of a set of pixel values coded with arithmetic codes.

20. The apparatus of claim 6, wherein the side information is representative of a set of pixel values, the pixel values comprising at least one neighboring pixel that is available for prediction.

21. The method of claim 12, wherein the side information is representative of a set of pixel values, further wherein at least one of the pixel values comprises a neighboring pixel that is available for prediction.

22. The apparatus of claim 14, wherein the side information is representative of a set of pixel values, further wherein at least one of the pixel values comprises a neighboring pixel that is available for prediction.

* * * * *

UNITED STATES PATENT AND TRADEMARK OFFICE
CERTIFICATE OF CORRECTION

PATENT NO. : 8,254,450 B2  
APPLICATION NO. : 12/194498  
DATED : August 28, 2012  
INVENTOR(S) : Ugur et al.

Page 1 of 1

It is certified that error appears in the above-identified patent and that said Letters Patent is hereby corrected as shown below:

In the Claims:

Column 10,  
Line 27, cancel "values for";  
Line 55, cancel "coded".

Column 11,  
Line 8, "claim 12" should read --claim 10--.

Signed and Sealed this  
Twenty-third Day of April, 2013

Teresa Stanek Rea  
*Acting Director of the United States Patent and Trademark Office*